United States Patent [19]

Miyata et al.

[11] Patent Number: 5,496,986
[45] Date of Patent: Mar. 5, 1996

[54] APPARATUS FOR APPLYING HARD FACING TO VALVE

[75] Inventors: Hiroshi Miyata; Yoshio Chiba; Osamai Noguchi; Tsutomu Oka; Minoru Nakane, all of Okegawa, Japan

[73] Assignee: Mitsubishi Materials Corporation, Tokyo, Japan

[21] Appl. No.: 358,170

[22] Filed: Dec. 16, 1994

[30] Foreign Application Priority Data

| Dec. 27, 1993 | [JP] | Japan | 5-333737 |
| Jan. 14, 1994 | [JP] | Japan | 6-002793 |
| Mar. 8, 1994 | [JP] | Japan | 6-037367 |

[51] Int. Cl.⁶ ................................................. B23K 9/04
[52] U.S. Cl. ............................... 219/125.1; 219/76.14
[58] Field of Search ........................ 219/125.1, 137 R, 219/76.1, 76.14, 76.15; 901/42

[56] References Cited

U.S. PATENT DOCUMENTS

| 2,729,578 | 1/1956 | Hedlund et al. | 219/76.1 |
| 2,862,101 | 11/1958 | Klinke | 219/76.15 |
| 3,813,509 | 5/1974 | Woods et al. | 219/76.14 |

*Primary Examiner*—Clifford C. Shaw
*Attorney, Agent, or Firm*—Armstrong, Westerman, Hattori, McLeland & Naughton

[57] ABSTRACT

A fillet welding apparatus for fillet welding on heads of valves for internal combustion engines, such apparatus including a valve blank stock storage station, a welding torch for fillet welding on valve heads of each valve blank, and feed apparatus for engaging and feeding valve blanks from the stock storage station to the welding torch and from the fillet welding torch to a product valve storage station, the feed apparatus including means for counting and feeding selected of the counted valves to a testing station.

5 Claims, 6 Drawing Sheets

APPARATUS FOR APPLYING HARD FACING TO VALVE

The present invention relates to a fillet welding apparatus for fillet-welding a different kind of material on valve heads of intake valves or exhaust valves for use in internal combustion engines.

BACKGROUND OF THE INVENTION

As well known in the art, because valve heads of intake valves, or exhaust valves, for use in internal combustion engines are repeatedly brought into abutment against valve seats at a high speed, a high degree of wear resistance is required for the valve heads. As shown in FIG. 7, therefore, a highly wear-resistance material (e.g., a Co—Cr—W—C base alloy) is fillet-welded, at 3, FIG. 7, to a valve head 2 of a valve 1. The fillet-welded portion is then mechanically machined (e.g., ground) into a desired shape. Heretofore, such fillet welding to the valve head has been manually carried out by a worker using a welding rod of the Co—Cr—W—C base alloy while the valve is fixedly held on a holder.
Problems Solved by the Invention The conventional fillet welding method, however, has a problem that because the fillet welding is manually performed by workers, the welded fillets are varied in thickness and position depending on the skill of the workers. Thus, quality of the fillet welding is not stable.

Also, in the conventional fillet welding method, fillet welding is manually carried out by workers who pick up, by hand, a valve blank, holds such valve blank on a holder, performs the fillet welding, and removes the valve from the holder after fillet welding. Productivity per unit time is extremely low.

To solve the above problems, it would be conceivable to employ a robot for supplying valve blanks and discharging product valves. But, because the valve blanks and the product valves each have a configuration defined by an umbrella-shaped valve head and a rod-shaped valve stem, which are joined together, there is a difficulty in handling them by a robot and risks that workpieces would be incorrectly held by handling means of the robot and slipped off from the handling means during transfer. The supply accuracy of workpieces to the holder would be poor.

Preferably, fillet-welded valves, hereinafter referred to as product valves, are sampled periodically (e.g., once per 100 valves) and the sampled product valves are subject to a destructive test, for example, by cutting the product valve, observing the cut section in enlarged scale, and checking the welded state.

To this end, workers must memorize, or record, the number of product valves which have been fillet welded. It is, however, unavoidable that the workers are apt to forget to sample the product valve or the sampling interval is varied, with a resultant difficulty in ensuring satisfactory quality of the fillet welding.

In view of the state of art described above, an object of the present invention is to provide a fillet welding apparatus by which high productivity can be achieved, valves can always be correctly held, and one of fillet-welded valves can be automatically sampled each time the predetermined number of valves are fillet-welded.

To solve the above problems, according to one embodiment of the present invention, there is provided a fillet welding apparatus for fillet-welding a different kind of material on valves heads of intake valves, or exhaust valves, for use in internal combustion engines, the apparatus being characterized in comprising valve blank stock means for storing valve blanks to be fillet-welded, a welding torch for performing fillet welding on a valve head of each of the valve blanks, valve blank holding means for holding the valve blank such that the valve head of the valve blank faces the welding torch, product valve stock means for storing product valves having been fillet-welded by the welding torch, and valve transfer means for transferring the valve blank from the valve blank stock means to the valve blank holding means, and for transferring the product valve from the valve blank holding means to the product valve stock means. The valve transfer means includes swing arm means mounted to be swingable about at least one point on the stationary side from the valve blank stock means to the valve blank holding means, then from the valve blank holding means to the product valve stock means, and then from the product valve stock means to the valve blank stock means, the swing arm means having chuck means attached to its distal end to grasp a valve stem of the valve blank or the product valve from both sides.

In the fillet welding apparatus according to the invention, a rotating member is rotatably attached to the distal end of the swing arm means, and a plurality of chuck means are attached to an outer peripheral portion of the rotating member.

In the fillet welding apparatus according to the invention, each of the chuck means comprises two abutting means capable of moving closer and away from each other, and drive means for moving the abutting means to come closer and away from each other. One of the two abutting members has two first V-shaped grooves which are brought into abutment against the valve stem of the valve blank or the product valve at two points spaced axially of the valve stem. The other of the two abutting members has a second groove which is brought into abutment against the valve stem at a point between the two first grooves.

In the fillet welding apparatus according to the invention, a sampling chute, for allowing a sample of the product valves to be dropped therethrough, is provided near the product valve stock means. Control means for the valve transfer means is provided to control the valve transfer means so that when the number of transfer cycles, in each of which the valve blank is transferred from the valve blank stock means to the valve blank holding means and the product valve is transferred from the valve blank holding means to the product valve stock means by the valve transfer means, reaches a predetermined number, the product valve transferred by the valve transfer means is supplied to the sampling chute.

With the fillet welding apparatus according to the present invention, the swing arm means of the valve transfer means is swung about at least one point on the stationary side toward the valve blank stock means so that the chuck means, attached to the distal end of the swing arm means, is directed to one of the valve blanks stored in the valve blank stock means. Next, the valve blank is held by being grasped, at its valve stem, by the chuck means laterally from both sides. In this condition, the swing arm means of the valve transfer means is swung about at least one point on the stationary side from the valve blank stock means toward the valve blank holding means. Then, the valve blank, held by the chuck means, is transferred to the valve blank holding means which holds the valve blank such that a valve head of the valve blank faces the welding torch, followed by fillet welding on the valve head. Next, a finished product valve is held by being grasped at its valve stem by the chuck means laterally from both sides, and is removed from the valve blank holding means. The swing arm means is swung about at least one point on the stationary side from the valve blank holding means toward the product valve stock means. When the product valve, grasped by the chuck means, is positioned to face the product valve stock means, the product valve is released from its grasped state by the chuck means to be stored in the product valve stock means. Then, the swing arm means is swung about at least one point on the stationary side from the product valve stock means toward the valve blank stock means. Subsequently and in a like manner, another valve blank is held by being grasped at its valve stem by the chuck means laterally from both sides, the swing arm means is swung toward the valve blank holding means, and the transferred valve blank is set to the valve blank holding means. Thus, transfer, setting and fillet welding of the valve blank, and removal and transfer of the product valve can be performed in successive steps.

With the fillet welding apparatus according to the present invention, the swing arm means of the valve transfer means is swung about at least one point on the stationary side, toward the valve blank stock means, to rotate the rotating member, attached to the distal end of the swing arm means, so that one of the plurality of chuck means, attached to the outer peripheral portion of the rotating member, is directed to one of the valve blanks stored in the valve blank stock means. Next, the valve blank is held by being grasped at its valve stem by the chuck means laterally from both sides. In this condition, the swing arm means of the valve transfer means is swung about at least one point on the stationary side from the valve blank stock means toward the valve blank holding means. Then, the valve blank, held by the chuck means, is transferred to the valve blank holding means which holds the valve blank such that a valve head of the valve blank faces the welding torch, followed by fillet welding on the valve head. Next, a finished product valve is held by being grasped at its valve stem by the chuck means laterally from both sides, and the rotating member is rotated to remove the product valve from the valve blank holding means. With the rotation of the rotating member, another valve blank grasped by the chuck means, other than the one grasping the product valve from both sides, is set to the valve blank holding means. Then, the swing arm means is swung about at least one point on the stationary side from the valve blank holding means toward the product valve stock means. When the product valve, grasped by the chuck means, is positioned to face the product valve stock means, the product valve is released from its grasped state by the chuck means to be stored in the product valve stock means. Then, the swing arm means is swung about at least one point on the stationary side from the product valve stock means toward the valve blank stock means. Subsequently and in a like manner, another valve blank is held by being grasped at its valve stem laterally from both sides by the one of the chuck means which are attached to the outer peripheral portion of the rotating member, and the swing arm means is swung toward the valve blank holding means. Further, by rotating the rotating member, the transferred valve blank is set to the valve blank holding means, and the product valve is removed from the valve blank holding means and transferred to the product valve stock means, as described above. Thus, transfer, setting and fillet welding of the valve blank, and removal and transfer of the product valve can be performed in successive steps.

With the fillet welding apparatus according to the present invention, the valve stem of the valve blank, or the product valve, is grasped by the chuck means from both sides. At this time, when the two abutting means of the chuck means are driven to come closer to each other, the two first V-shaped grooves of one of the two abutting members are brought into abutment against the valve stem of the valve blank, or the product valve, at two points spaced axially of the valve stem, and the second groove of the other abutting member is brought into abutment against the valve stem at a point between the two first grooves. With such an arrangement, the valve blank, or the product valve, is positively held at three points by the first grooves and the second groove of the two abutting members. As a result, it is possible to prevent the valve blank, or the product valve, from losing its correctly held state during transfer, prevent it from slipping off the chuck means, and further prevent a reduction in supply accuracy thereof to the valve blank holding means.

With the fillet welding apparatus of the present invention, when the number of transfer cycles, in each of which the valve blank is transferred from the valve blank stock means to the valve blank holding means and the product valve is transferred from the valve blank holding means to the product valve stock means by the valve transfer means, reaches a predetermined number, control means for the valve transfer means controls the valve transfer means so that the product valve transferred by the valve transfer means is supplied to the sampling chute. In other words, upon the predetermined number of transfer cycles being reached, the product valve is automatically sampled.

BRIEF DESCRIPTION OF THE DRAWINGS

A fillet welding apparatus, according to one embodiment of the present invention, will be hereinafter described with reference to FIGS. 1 to 6, in which.

DETAILED DESCRIPTION OF THE PREFERRED EMBODIMENTS

Figure 1:
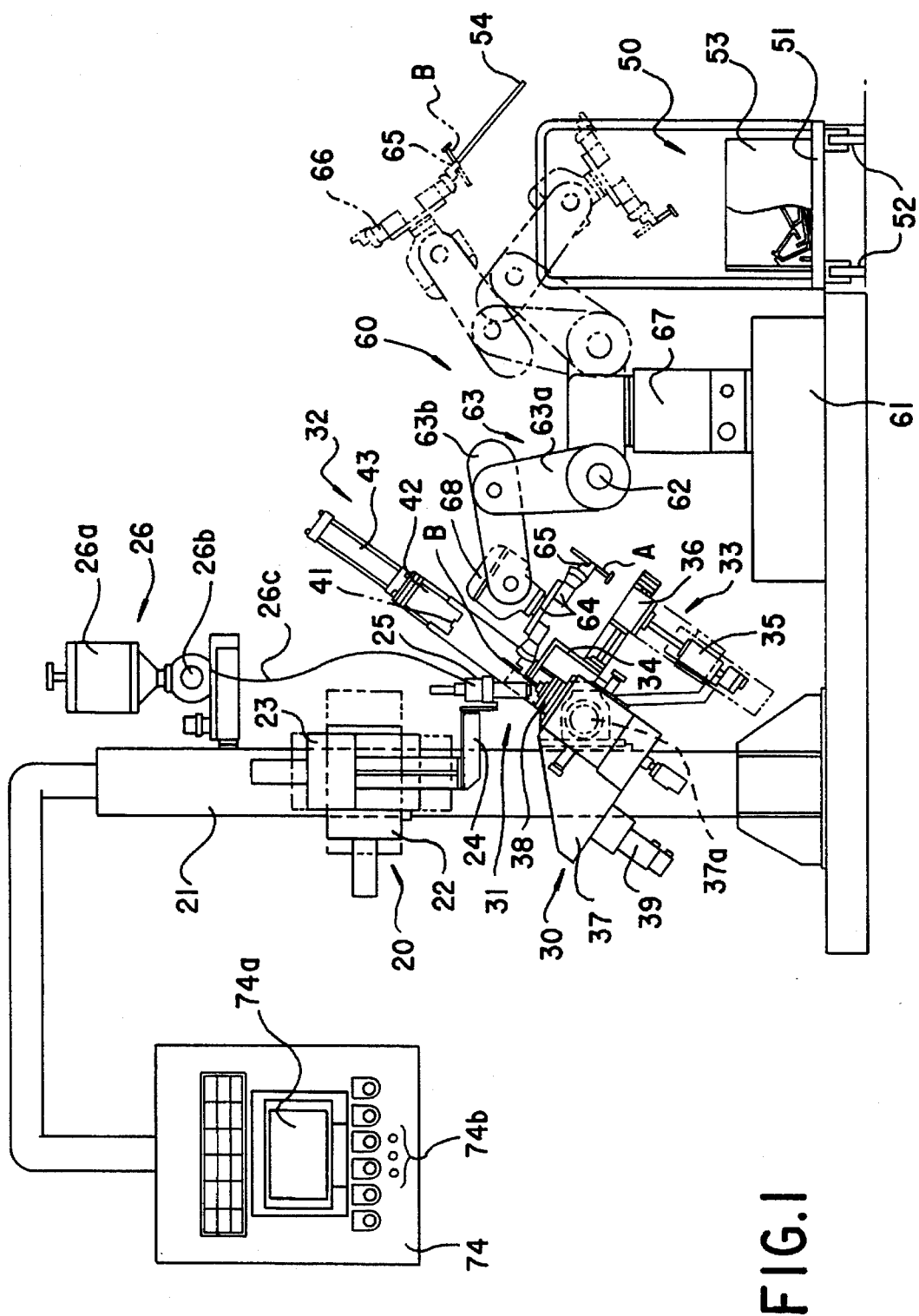
FIG. 1 is a front view of a fillet welding apparatus according to one embodiment of the present invention.
Figure 2:
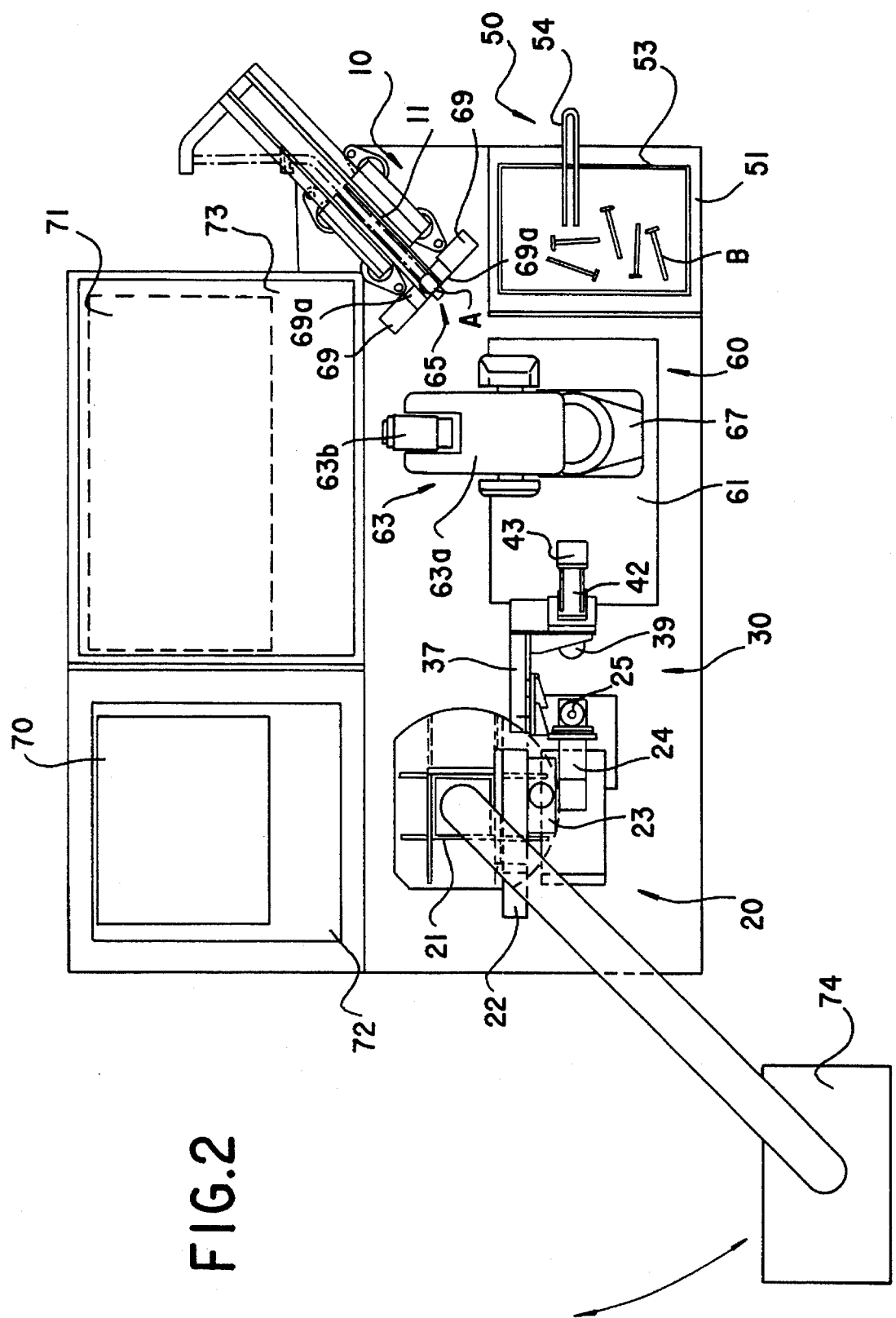
FIG. 2 is a plan view of the fillet welding apparatus shown in FIG. 1.

The fillet welding apparatus of this embodiment comprises valve blank stock means 10 for stocking valve blanks A to be subject to fillet welding, welding means 20 for performing the fillet welding on a valve head of each of the valve blanks A, valve blank holding means 30 for holding the valve blank A in an oblique position such that the valve head of the valve blank A faces a torch 25 of the welding means 20, and for rotating the valve blank A about its axis, product valve stock means 50 for stocking product valves B which have been fillet-welded by the welding means 20, and valve transfer means 60 for transferring the valve blank A from the valve blank stock means 10 to the valve blank holding means 30 and for transferring the product valve B from the valve blank holding means 30 to the product valve stock means 50.

The valve blank holding means 30 comprises rotary table means 31 against which the valve head of the valve blank A is abutted at its side end face, valve attaching/detaching means 32 disposed obliquely upwardly of the rotary table means 31 in spaced relationship and pressing a valve stem of the valve blank A from above to hold the valve blank A against the rotary table means 31 in a detachable manner, and valve attaching/positioning means 33 for attaching the valve blank A while positioning an axis of the valve blank A to be substantially aligned with an axis of rotation of the rotary table means 31.

The valve attaching/positioning means 33 comprises a supporting member 34 formed in its distal end with a V-shaped groove against which the valve stem of the valve blank A is abutted at its side face to support the valve blank in an oblique position, axially moving means (e.g., an air cylinder) 35 for moving the support member 34 in the axial direction of the valve blank A, and radially moving means (e.g., an air cylinder) 36 for moving the support member 34 in the radial direction of the valve blank A. The support member 34 is unitedly fixed to a reciprocating member (e.g., a piston rod) of the radially moving means 36, and the radially moving means 36 is unitedly attached to a reciprocating member (e.g., a piston rod) of the axially moving means 35. When the reciprocating member of the axially moving means 35 is advanced and retracted, the support member 34 is moved in the axial direction of the valve blank A together with the radially moving means 36.

The valve transfer means 60 comprises swing arm means 63 mounted to be swingable about one point 62 on the side of the stationary base 61 from the valve blank stock means 10 to the valve blank holding means 30, then from the valve blank holding means 30 to the product valve stock means 50, and then from the product valve stock means 50 to the valve blank stock means 10, a rotating member 64 rotatably attached to the distal end of the swing arm means 63, and two chuck means 65, 66 attached to an outer peripheral portion of the rotary member 64 in two positions spaced along the circumferential direction with an axis of rotation of the rotating member 64 located therebetween, each chuck means grasping the valve stem of the valve blank A or the product valve B laterally from both sides.

On the stationary base 61, there is mounted a swivel 67 capable of turning in a horizontal plane. One end of the swing arm means 63 is coupled to an upper portion of the swivel 67. The swing arm means 63 comprises a first arm member 63a pivotably coupled to the swivel 67 and a second arm member 63b pivotably coupled to the distal end of the first arm member 63a. These arm members 63a, 63b are arranged to be able to change their swing angles independently of each other. A motor 68 is attached to the distal end of the second arm member 63b in such a manner that the angle of a rotary shaft of the motor with respect to the second arm member 63b is variable. The aforementioned rotating member 64 is fixed to the rotary shaft of the motor 68.

Figure 4:
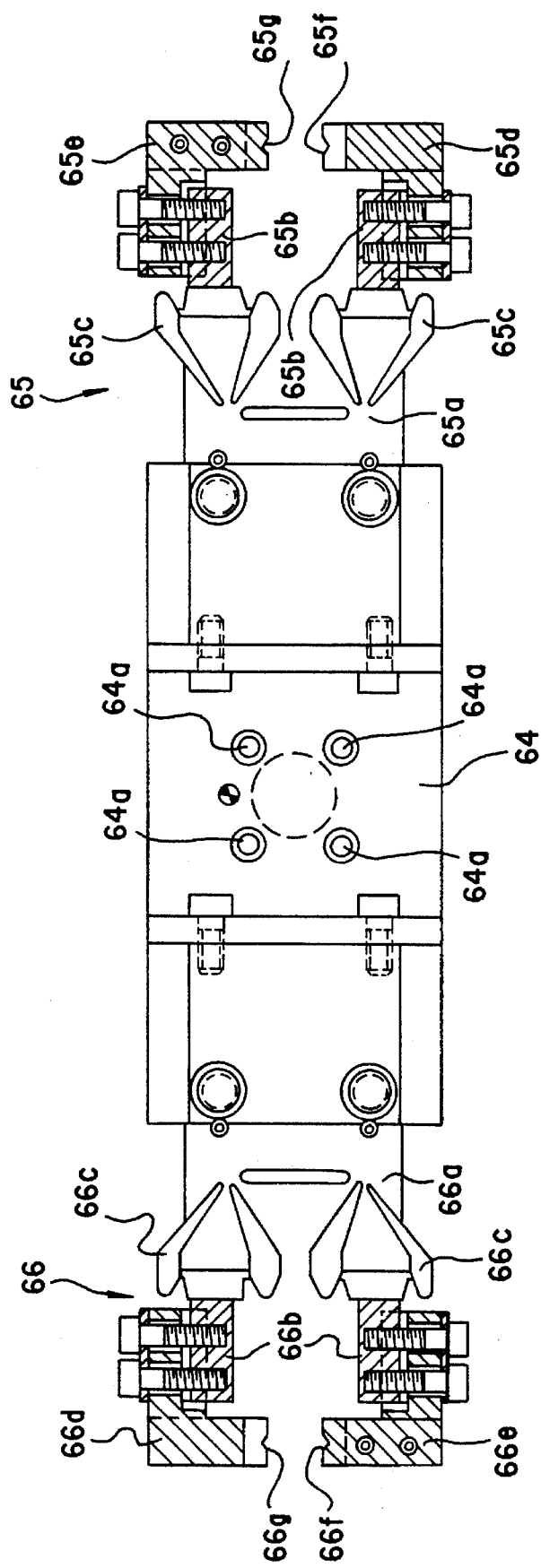
FIG. 4 is a plan views partly broken, showing chuck means for use in the fillet welding apparatus of FIG. 1.
Figure 5:
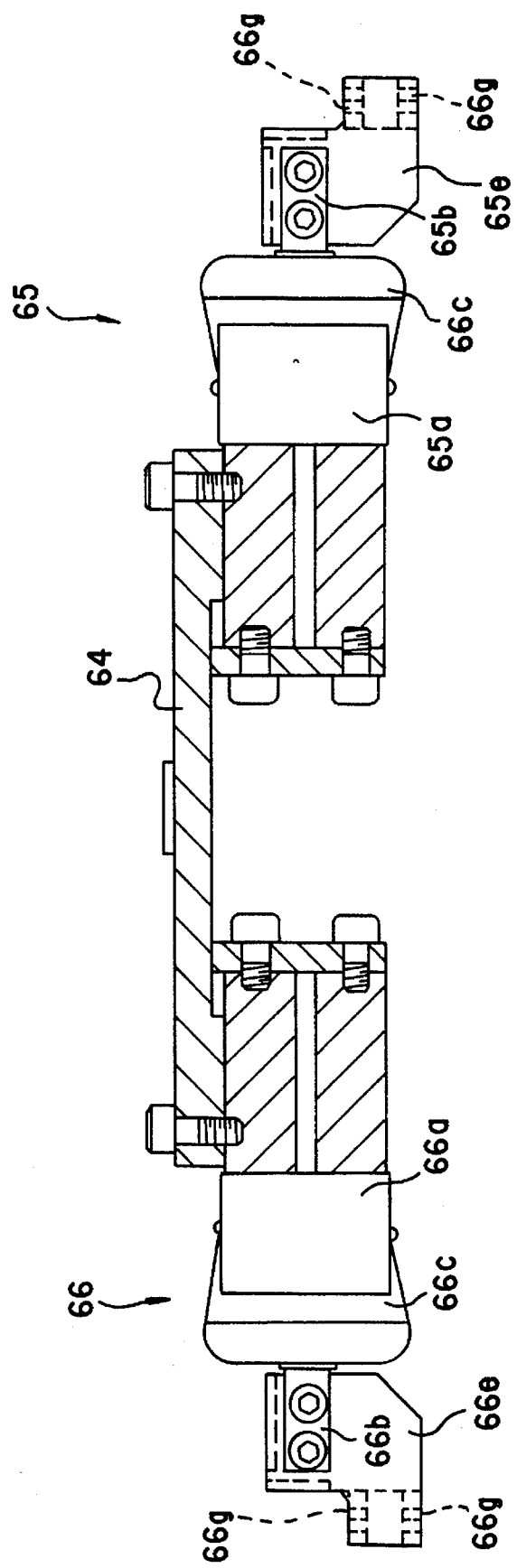
FIG. 5 is a side view, partly broken, of the chuck means shown in FIG. 3.
Figure 6:
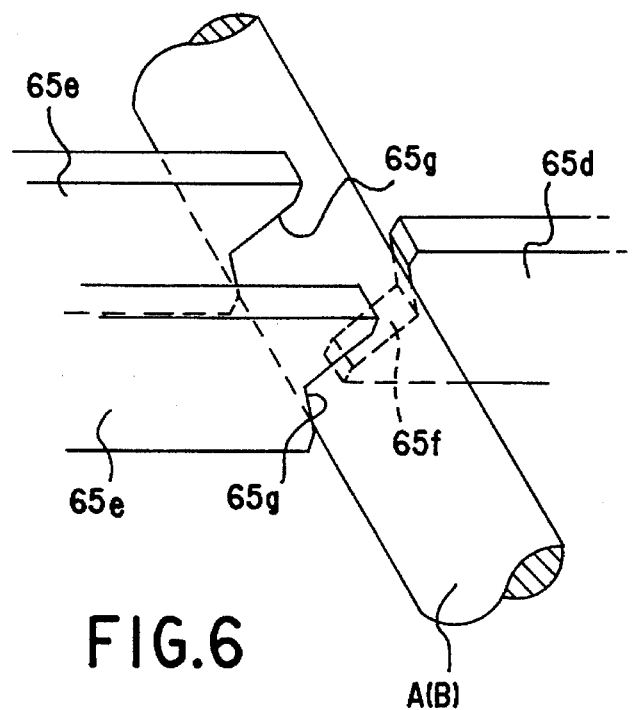
FIG. 6 is a perspective view, partly broken, of the chuck means shown in FIGS. 3 and 4.
Figure 7:
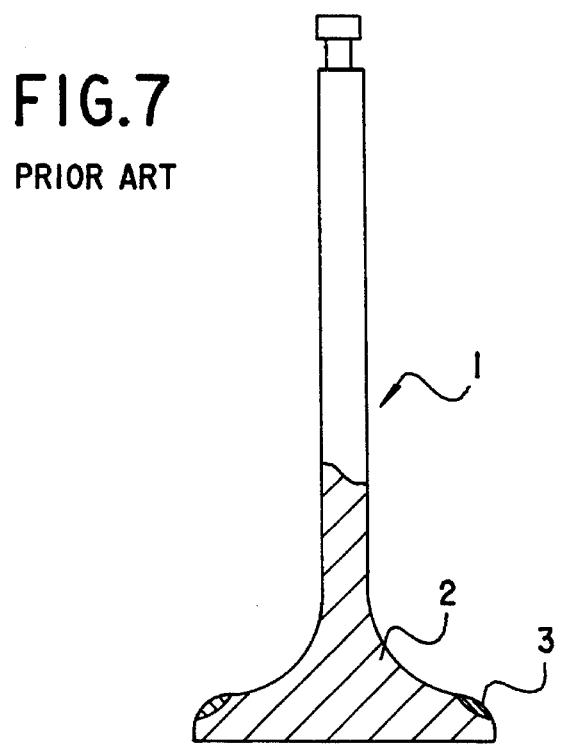
FIG. 7 is a view of a prior art hard facing application to a valve.

As shown in FIGS. 4 to 6, the chuck means 65, 66 are fixed to the underside of the rotating member 64 in its opposite sides which is substantially in the form of a plate and is in turn fixed to the rotary shaft of the motor 68 by bolts 64a. The chuck means 65 and the chuck means 66 are of the same structure. More specifically, drive means (e.g., air or hydraulic cylinders) 65a, 66a are fixed to the underside of the rotating member 64 and are each provided with two driven jaws 65b, 66b, respectively, which are driven to come close and away from each other. Covers 65c, 66c made of elastic material such as rubber are attached to the base ends of the driven jaws 65b, 66b for preventing dust and welding material from entering the drive means 65a, 66a. Further, abutting member 65d, 65e, 66d, 66e, coming into abutment against corresponding side faces of the valve stems, are fixed to outer surfaces of the driven jaws 65b, 66b by bolts. As shown in FIG. 6, the abutting members 65e, 66e on one side with respect to the valve stems are each extended from the base end so as to have two vertically bifurcated fingers with first V-shaped grooves 65g, 66g formed at the respective finger ends. The abutting members 65d, 66d on the other sides are positioned to be able to enter between the bifurcated fingers of the abutting members 65e, 66e on one side, and have second V-shaped grooves 65f, 66f formed at their distal ends. With such a construction, as shown in FIG. 6 by way of example, the valve stem of the valve blank A or the product valve B can be surely grasped by the abutting members 65d, 65e from both sides.

The valve blank stock means 10 includes lining-up/-supplying means (e.g., a part feeder) for lining up the valve blanks A one by one and transferring them successively.

The welding means 20 comprises a guide post 21 installed to stand vertically, a carriage 22 mounted to the guide post 21 in a vertically movable manner, a carriage 23 mounted on the carriage 22 in a horizontally movable manner, a bracket 24 fixed to the lower end of the carriage 23, a welding torch 25 attached to the distal end of the bracket 24 so as to extend in the vertical direction, and power supply means 26 for supplying a welding material in the form of powder to the welding torch 25. The position of the welding torch 25 can be adjusted by moving the carriages 22, 23 in the vertical and horizontal directions.

Figure 3A:
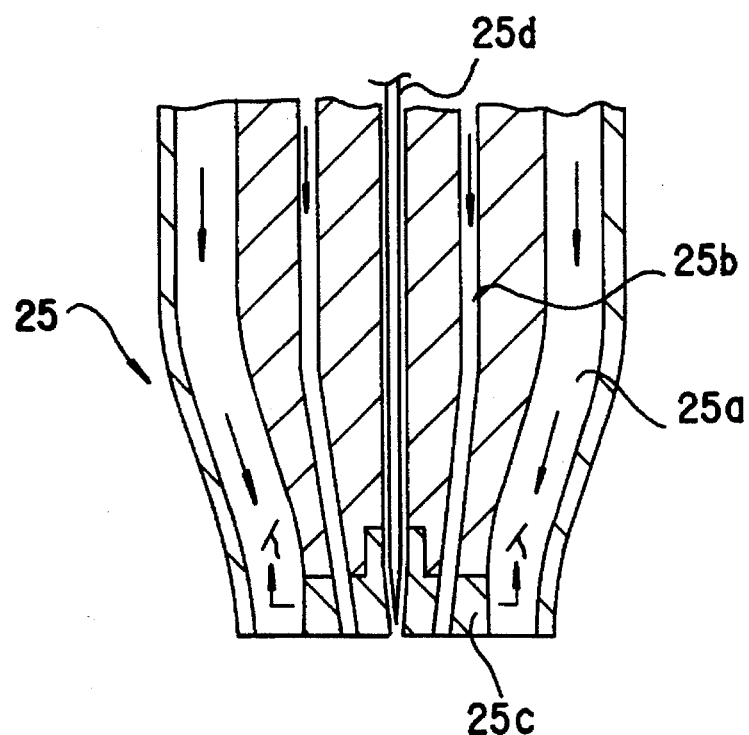
FIGS. 3A and 3B are views of a welding torch for use in the fillet welding apparatus of FIG. 1.
Figure 3B:
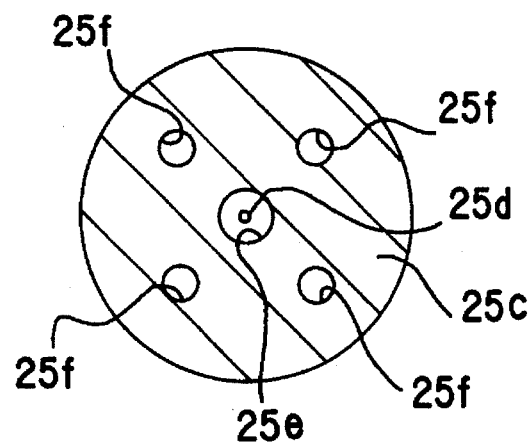

As shown in FIG. 3, the welding torch 25 is in the form of a double-wall pipe. A powdery welding material is supplied under pressure with argon gas or the like through an inner pipe 25b, and a welding gas is supplied under pressure through an annular space between the inner pipe 25b and an outer pipe 25a. A copper-made chip 25c is fixed to the distal end of the inner pipe 25b. The chip 25c has a central penetration hole 25e through which an electrode 25d is inserted, and peripheral penetration holes 25f through which the powdery welding material is ejected. A welding current is applied from the electrode 25d to the welding material ejected through the penetration holes 25f to melt the same, and the melted welding material is ejected toward the valve head. The diameter of the penetration holes 25f is increased over time because of the melted welding material being ejected therethrough. Therefore, the chip 25c is replaced by a new one after a predetermined period of use.

The powder supply means 26 comprises a hoper 26a for storing the powdery welding material, a rotating knurled roller 26b onto which the welding material in the hopper 26a is dropped, an under-pressure feed pipe 26c through which the powder accumulated on the knurled surface of the roller 26b is supplied under pressure to the welding torch 25 with a flow of argon gas upon rotation of the roller 26b, and not-shown weight measuring means (e.g., a load cell) for measuring the weight of the hopper 26a to properly adjust the amount of the welding material supplied. The weight measuring means measures the total weight of the dead load of the hopper 26a itself and the welding material stored therein. Since the weight of the welding material consumed for fillet welding of one valve blank A is too small to measure it accurately, the weight of the welding material consumed is determined from the weight difference between before and after the fillet welding is performed plural times (e.g., 100 times), and the determined weight is compared with a preset reference value. The rotational speed of the rotating knurled roller 26b is adjusted in accordance with the compared result, thereby adjusting the amount of the welding material supplied under pressure.

The rotary table means 31 comprises a swing block 37 rotatably supported by the guide post 21 through a support 37a, a rotating stage 38 rotatably mounted to the swing block 37, and a motor 39 fixed to the swing block 37 and having a rotary shaft coupled to the rotating stage 38 by a belt.

The valve attaching/detaching means 32 comprises a reciprocating block 42 arranged in coaxial relation to the rotating stage 38 and having a groove 41 formed at the center into which the valve stem is inserted, and a cylinder 43 supported by the swing block 37 for advancing and retracting the reciprocating block 42 in coaxial relation to the rotating stage 38.

The product valve stock means 50 comprises a carriage buggy 51 having wheels 52 mounted to its underside, a box-shaped pallet 53 rested on the carriage buggy 51 and being open upwardly, and a sampling chute 54 for taking out a sample of the product valves B per predetermined number of the product valves.

In the vicinity of the rotating stage 38 of the valve blank holding means 30, a valve attachment surface grinder (not shown) for grinding an upper surface of the rotating stage 38 is disposed to be movable between a position where it contacts the rotating stage 38 and a position where it is away from the rotating stage 38. The valve attachment surface grinder serves to flatten the valve attachment surface on which welding beads have been deposited.

Further, denoted by 70 in the drawing is control means for the valve transfer means for controlling operation of the valve transfer means 60 (e.g., the positions where the valve blanks are grasped by the chuck means 65, 66, the position where the valve blank is supplied to the valve blank holding means 30, the position where the product valve is discharged to the product valve stock means 50, the standby time between successive operations, the timing of sampling, the number of the product valves sampled, etc.), 71 is cooling water recirculating means for recirculating cooling water to the welding means 20 and the valve blank holding means 30. 72 is a welding power supply unit for supplying electric power to the welding means 20. 73 is an overall control means for controlling welding conditions such as the position of the welding torch 25 and plasma gas conditions in the welding means 20, powder supply conditions in the powder supply means 26, rotating conditions of the valve blank A in the valve blank holding means 30, etc., and 74 is a control panel for issuing commands to the control means 70 for the valve transfer means, the cooling water recirculating means 71, the welding power supply unit 72, and the overall control means 73. The control panel 74 includes a display 74a for displaying various information, knobs 74b for continuously changing the current value of the welding power supply unit 72, the amount of powder supplied by the powder supply means 26, and the rotational speed of the rotating stage 38, etc.

Operation of the fillet welding apparatus of this embodiment will be described below.

First, data such as the shape and material of valves to be subject to fillet welding and the material to be fillet-welded on the valves are entered through the control panel 74. Of many operation programs set for respective valve types, one program optimum for the valve type to be subject to fillet welding is thereby selected. The selected operation program sets, for example, the operation of the valve transfer means 60 (e.g., the positions where the valve blanks are grasped by the chuck means 65, 66, the position where the valve blank is supplied to the valve blank holding means 30, the position where the product valve is discharged to the product valve stock means 50, the standby time between successive operations, the timing of sampling, the number of the product valves sampled, etc.), the welding conditions, such as, the position of the welding torch 25 and plasma gas condition in the welding means 20, the powder supply conditions in the powder supply means 26, rotating conditions of the valve blank A in the valve blank holding means 30, etc. Additionally, the current value of the welding power supply unit 72, the amount of powder supplied by the powder supply means 26, and the rotational speed of the rotating stage 38 may be continuously changed by the knobs 74b, while visually checking the data indicated on the display 74a of the control panel 74, and the actual welding status.

Then, a series of operations described below are automatically carried out in accordance with the selected operation program. Therefore, even when fillet welding is performed on various types of valves being different in shape and/or material from each other, it is only required to simply select the preset operation program with no need of setting various conditions, and hence the prearranging operation is simple.

More specifically, as indicated by two-dot-chain lines in FIG. 1, the swivel 67 on the stationary base 61 is turned toward the valve blank stock means 10, the swing arm means 63 is swung about the one point 62, and the rotating member 64 attached to the distal end of the swing arm means 63 is rotated to direct the chuck means 65 also toward the valve blank stock means 10. The lining-up/supplying means 11 is operated to line up the valve blanks A and supply them successively. The valve stem of each of the valve blanks A supplied is grasped by the chuck means 65 laterally from both sides. The position where the valve stem is grasped is set by the operation program so as to provide an appropriate position depending on the shape (such as length and thickness) of the valve.

When the driven jaw 65b are driven by the drive means 65a of the chuck means 65 to come closer to each other to grasp the valve stem of the valve blank A by the abutting members 65d, 65e from both sides, the valve stem is brought into abutment against the two first V-shaped grooves 65g, which are formed at the distal ends of the vertically bifurcated fingers of the abutting member 65e, at two points spaced axially of the valve stem from one side, and against the second groove 65f at the distal end of the abutting member 65d from the other side at a point between the two first grooves 65g. Therefore, the valve blank A is positively held at three points by the first grooves 65g and the second groove 65f of the two abutting members. As a result, it is possible to prevent the valve blank A from losing its correctly held state during transfer, prevent it from slipping off the abutting members 65d, 65e of the chuck means 65, and further prevent a reduction in supply accuracy thereof to the valve blank holding means 30. These advantages are also equally obtained in later-described grasping operation by the abutting members 66d, 66e of the other chuck means 66.

Then, as indicated by solid lines in FIG. 1, the swivel 67 is turned toward the valve blank holding means 30, and the swing arm means 63 is also swung toward the valve blank holding means 30. At this time, the motor 68 is rotated with respect to the second arm member 63b to position the valve blank A, grasped by the chuck means 65, such that the axis of rotation of the rotating member 64 is located between the valve blank A and the valve blank holding means 30.

Next, the motor 68 is rotated to turn the rotating member 64 through 180° so that the valve blank A grasped by the chuck means 65 is positioned between the rotating stage 38 of the valve blank holding means 30 and the reciprocating block 42.

Then, the axially moving means 35 is moved in the axial direction of the valve blank A and is stopped when the distal end of the support member 34 reaches a predetermined position. The stop position is determined, depending on the center of gravity of the valve, and is preset by the operation program corresponding to the valve shape. After that, the radially moving means 36 is moved to approach the valve blank A in the radial direction so that the distal end of the support member 34 is abutted against the outer circumference of the valve stem of the valve blank A. Subsequently, the chuck means 65 is disengaged from the valve stem and the swing arm means 63 is moved a little away from the valve blank A. Thereby, the valve blank A is released from its grasped state by the chuck means 65, and is now held by the support member 34 in an oblique position. Then, the radially moving means 36 is further moved radially of the valve blank A, causing the valve blank A to move toward the rotating stage 38 in the radial direction through the support member 34 so that the axis of the valve blank A and the axis of rotation of the rotating stage 38 are aligned with each other. The amount by which the radially moving means 36 is moved at this time is also preset by the selected operation program.

If the axial alignment was performed by using the swing arm means 63, the accurate alignment would be difficult because of swing movement of the means 63 along an arcuate path. In contrast, because this embodiment employs the valve attaching/positioning means 33 comprised of the axially moving means 35 and the radially moving means 36, the axis of the valve blank A and the axis of rotation of the rotating stage 38 can be aligned with each other at high accuracy. Consequently, when the valve head is subject to fillet welding, as described later, the high-quality fillet-welded portion, with a uniform thickness in the circumferential direction, can be formed.

Next, the cylinder 43 is extended to advance the reciprocating block 42 toward the rotating stage 38. With this advance of the reciprocating block 42, an upper portion of the valve stem of the valve blank A is inserted to the groove 41 defined centrally of the reciprocating block 42, and the valve blank A is pressed and held between the bottom of the groove 41 and the rotating stage 38. After that, the radially moving means 36 is contracted to move the support member 34 away from the outer circumference of the valve blank A. Then, by actuating the motor 39 to rotate the rotating stage 38, the valve blank A also starts rotating with the rotating stage 38.

Concurrently with, or before or after setting of the valve blank A to the valve blank holding means 30, the carriage 22 is moved along the guide post 21 and the carriage 23 is moved horizontally. With these movements, the welding torch 25, fixed to the carriage 23, is moved to a predetermined position where it faces from above the valve head of the valve blank A having been (or to be) held by the valve blank holding means 30. The amount by which the carriages 22, 23 are moved at this time are also preset by the selected operation program depending on the valve shape and so on.

Then, the powder supply means 26 is actuated to supply predetermined weight of the welding material to the welding torch 25. The welding material is ejected through the penetration holes 25f defined in the welding torch 25 while a high voltage is applied from the electrode 25d so as to melt the welding material. The melted welding material is ejected toward the valve head of the valve blank A. Because the valve blank A is supported by the valve blank holding means 30 in an oblique position during the rotation, the welding material is prevented from flowing out outwardly and is deposited on the valve head with a uniform thickness in the circumferential direction. Accordingly, the fillet-welded portion, of which quality is highly uniform and has less variations, can be formed.

While the fillet welding is being performed by the welding torch, the valve blank A to be next fillet-welded is transferred from the valve blank stock means 10 to a position near the valve blank holding means 30. More specifically, after the valve blank A has been supported by the support member 34, the swing arm means 63, etc. are in a free state, i.e., take no part in holding the valve blank A. Therefore, the swing arm means 63 is swung, the swivel 67 is turned, and the rotating member 64 is rotated in a predetermined sequence. Thus, the chuck means 66, attached to the rotating member 64 of the valve transfer means 60, is positioned to face another valve blank A in the valve blank stock means 10, and is actuated to grasp the valve blank A from both sides. Then, the swivel 67, the swing arm means 63, etc. are returned to the side of the valve blank holding means 30. At this time, the valve blank A, grasped by the chuck means 66, is positioned such that the axis of rotation of the rotating member 64 is located between the valve blank A and the valve blank holding means 30. In addition, the chuck means 65, grasping no valve blank A, is positioned to face the valve blank A under welding.

Upon completion of the fillet welding, the motor 39 is stopped to cease rotation of the rotating stage 38. Then, the swing arm means 63 is moved a little in the direction coming closer to the product valve B which has been subject to the fillet welding, so that the chuck means 65, attached to the rotating member 64 and grasping no valve blank, is moved toward the product valve B. Next, the product valve B is grasped and held by the chuck means 65. After that, the cylinder 43 is contracted to move the reciprocating block 42 obliquely upwardly, thereby releasing the product valve B from its pressed state by the reciprocating block 42. In this condition, the motor 68 is actuated to turn the rotating member 64 through 180°. The product valve B grasped by the chuck means 65 is moved to a position diametrically opposite to the previous position with the center of the rotating member 64 therebetween, whereas the valve blank A, grasped by the chuck means 66, is positioned between the rotating stage 38 and the reciprocating block 42. Subsequently, the valve blank A is aligned with the axis of rotation of the rotating stage 38 in the same manner as described above, and the valve head of the valve blank A is subject to fillet welding in the same manner as described above.

After the valve blank A has been held by the valve blank holding means 30, the product valve B, grasped by the chuck means 65, is transferred to the product valve stock means 50. More specifically, the swing arm means 63 is swung and the swivel 67 is turned in a predetermined sequence so that, as indicated by two-dot-chain lines in FIG. 1, the rotating member 64, attached to the distal end of the swing arm means 63, is moved to a position above the pallet 53 of the product valve stock means 50. Then, the product valve B is released from its grasped state by the chuck means 65 and is dropped into the pallet 53 by gravity to be stored therein. At this time, if the product valve B is dropped from a so high level, the fillet-welded portion may be damaged or cracked because the product valve B has been subjected to the fillet welding just before, or the other valve portions than the fillet-welded portion may be damaged. Therefore, the product valve B is dropped after the swing arm means 63 is sufficiently swung so that the product valve B grasped by the chuck means 65 becomes as close as possible to the pallet 53 level. The product valves B are stored within the pallet 53 not in a lined-up state, but in random. Furthermore, the movement of the swing arm means 63 is controlled so as to drop the product valve B from a lower level when the number of the product valves B stored in the pallet 53 is small, and to drop it from a progressively higher level as the number of the product valves B stored in the pallet 53 is increased. As a result, the product valves B are smoothly stored in the pallet 53.

Next, after releasing the product valve B, the swing arm means 63 is swung, and the swivel 67 is turned, in the same sequence as described above for grasping a new valve blank A. Thus, the rotating member 64 attached to the distal end of the swing arm means 63 is moved toward the valve blank stock means 10 so that the chuck means 65, provided on the rotating member 64, grasps the valve blank A. Then, the swing arm means 63 is swung, and the swivel 67 is turned, in the same sequence as described above for transferring the valve blank A toward the valve blank holding means 30. By repeating the above-described steps again thereafter, the valve heads of the valve blanks A can be performed successively.

When the number of transfer cycles, in each of which the valve blank A is transferred from the valve blank stock means 10 to the valve blank holding means 30 and the product valve B is transferred from the valve blank holding means 30 to the product valve stock means 50 by the valve transfer means 60, reaches a predetermined number (indicating the timing at which the product valve is to be sampled), the operation of the valve transfer means 60 is controlled by the control means 70 for the valve transfer means so that the product valve B, transferred by the valve transfer means 60, is supplied to the sampling chute 54. As a result, the product valve B is sampled automatically, periodically, to prevent it from being forgotten to sample or being sampled at irregular cycles. The sampled product valve is subject to a destructive test to check the actual state of the fillet-welded portion. By properly changing the welding conditions, based on the test result, the fillet welding can be performed under the more appropriate welding conditions.

In the fillet welding apparatus of this invention, the steps are simultaneously advanced in parallel such that while the valve blank A is being held by the valve blank holding member 30 and subject to the fillet welding by the welding torch 25, the valve blank A to be next supplied is transferred, or the product valve B is discharged into the product valve stock means 50. Therefore, the loss time in supplying the valve blanks A can be reduced and productivity of the fillet welding operation can be increased to a large extent.

Because the fillet welding apparatus of the present invention is constructed as described hereinabove, it is possible to, in successive steps, perform transfer, setting and fillet welding of a valve blank, and removal and transfer of a product valve. In addition, the valve blank and the product valve can be surely held and thus prevented from slipping off during transfer, resulting in improved productivity of the fillet welding. Furthermore, it is possible to prevent the product valve from being forgotten to sample or being sampled at irregular cycles, thus ensuring stable quality of the fillet-welded portion.

While the instant invention has been shown and described with specific reference to embodiments presently contemplated as the best mode of carrying out the invention in actual practice, it is to be understood that various changes may be made in adapting the invention to different embodiments without departing from the broader inventive concepts disclosed herein and comprehended by the claims which follow.

What is claimed:

1. A fillet welding apparatus for fillet-welding a material on valve heads of intake valves or exhaust valves for use with internal combustion engines, such material being different from the material of said valve heads, characterized in that said apparatus comprises valve blank stock means for storing valve blanks to be fillet-welded, a welding torch for performing fillet welding on a valve head of each said valve blanks, valve blank holding means for holding such valve blank such that the valve head of said held valve blank faces said welding torch, product valve stock means for storing product valves having been fillet-welded by said welding torch, and valve transfer means for transferring a valve blank from said valve blank stock means to said valve blank holding means, and for transferring a product valve from said valve blank holding means to said product valve stock means, wherein said valve transfer means includes swing arm means mounted to be swingable about at lest one point on the stationary side from said valve blank stock means to said valve blank holding means, then from said valve blank holding means to said product valve stock means, and then from said product valve stock means to said valve blank stock means, said swing arm means having chuck means attached to its distal end to grasp a valve stem of a valve blank or a product valve from both sides of said valve stem.

2. A fillet welding apparatus according to claim 1, wherein a rotating member is rotatably attached to the distal end of said swing arm means, and a plurality of chuck means are attached to an outer peripheral portion of said rotating member.

3. A fillet welding apparatus according to claim 1 or 2, wherein each of said chuck means comprises two abutting means capable of moving closer and away from each other, and drive means for moving said abutting means to come closer and away from each other, one of said two abutting members having two first V-shaped grooves which are brought into abutment against the valve stem at two points spaced axially of said valve stem, the other of said two abutting members having a second groove which is brought into abutment against the valve stem at a point between said two first grooves.

4. A fillet welding apparatus according to any one of claims 1 or 2, wherein a sampling chute for allowing a sample of the product valves to be dropped therethrough is provided near said product valve stock means, and control means for said valve transfer means is provided to control said valve transfer means to that when the number of a transfer cycles, in each of which the valve blank is transferred from said valve blank stock means to said valve blank holding means and the product valve is transferred from said valve blank holding means to said product valve stock means by said valve transfer means, reaches a predetermined number, the product valve transferred by said valve transfer means is supplied to said sampling chute.

5. A fillet welding apparatus according to claim 3, wherein a sampling chute for allowing a sample of the product valves to be dropped therethrough is provided near said product valve stock means, and control means for said valve transfer means is provided to control said valve transfer means to that when the number of a transfer cycles, in each of which the valve blank is transferred from said valve blank stock means to said valve blank holding means and the product valve is transferred from said valve blank holding means to said product valve stock means by said valve transfer means, reaches a predetermined number, the product valve transferred by said valve transfer means is supplied to said sampling chute.

* * * * *